July 14, 1953
H. WECHSLER
2,645,385
PRECISION SEED PLANTER
Filed Oct. 28, 1949
2 Sheets-Sheet 1
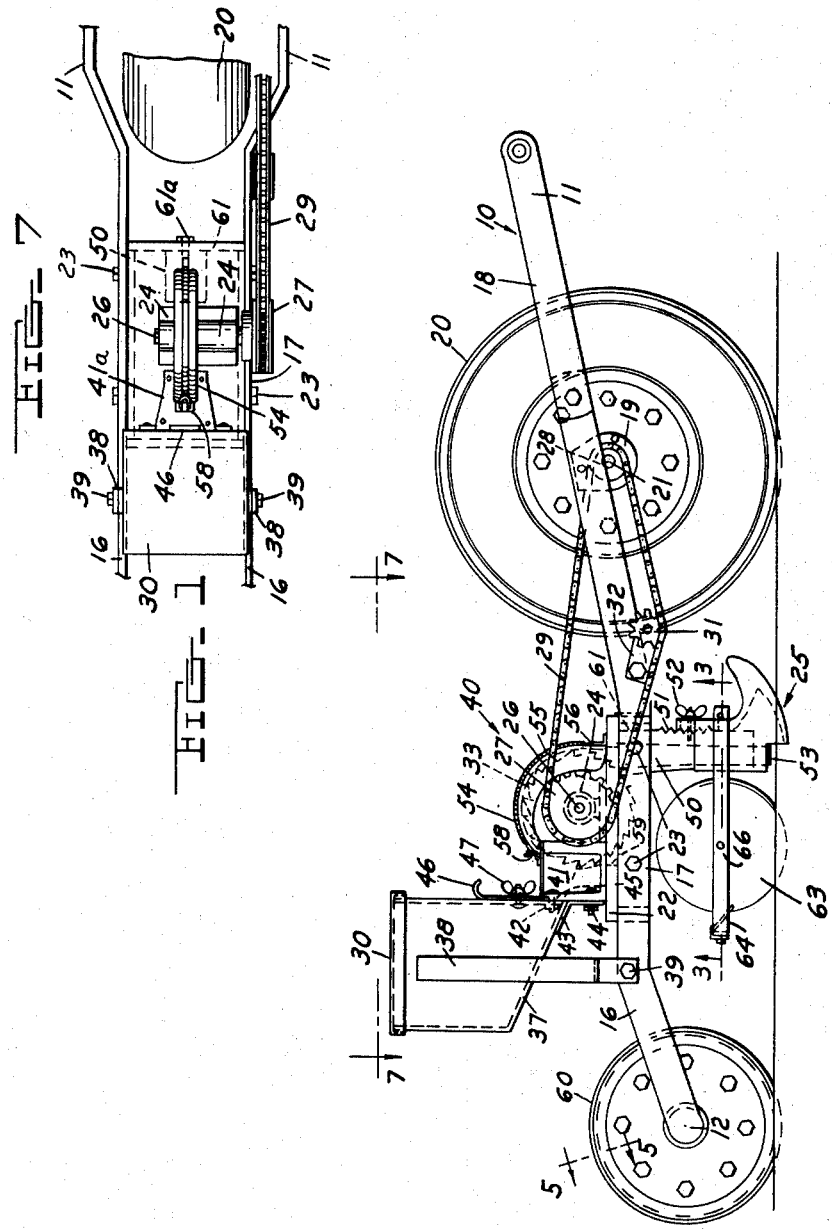
INVENTOR.
Herman Wechsler
BY
*W. A. Schauch*
ATTORNEY July 14, 1953 H. WECHSLER 2,645,385
PRECISION SEED PLANTER
Filed Oct. 28, 1949 2 Sheets-Sheet 2
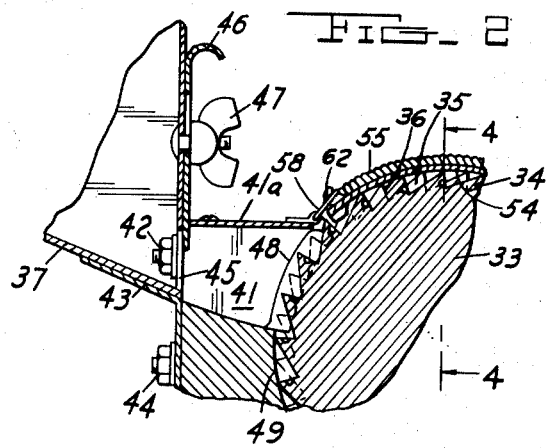
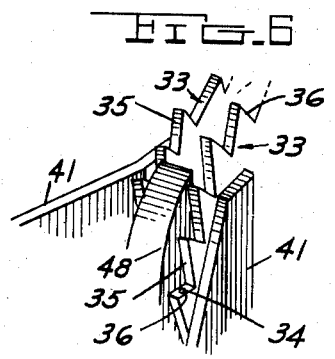
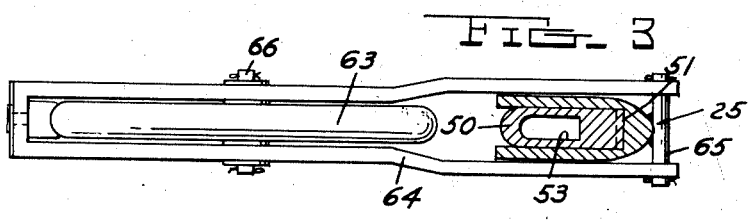
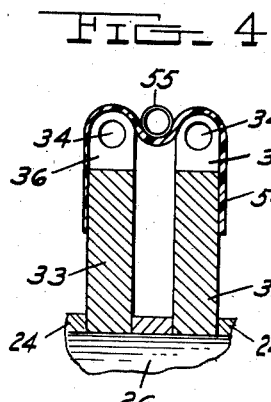
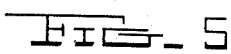
INVENTOR.
Herman Wechsler
BY
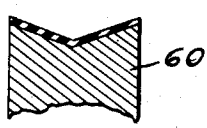
ATTORNEY Patented July 14, 1953

2,645,385

UNITED STATES PATENT OFFICE 2,645,385

PRECISION SEED PLANTER

Herman Wechsler, Ventura, Calif., assignor, by mesne assignments, to Dearborn Motors Corporation, Highland Park, Mich., a corporation of Delaware Application October 28, 1949, Serial No. 124,018

1 Claim. (Cl. 222—274)

This invention relates to a seed planter for planting seeds at regularly spaced intervals in the row with sufficient precision as to substantially eliminate the need for subsequent plant thinning.

It has long been the aim of manufacturers of seed planting machinery to provide the farmer, and particularly the vegetable grower, with a precision planting machine for planting individual seeds at a precise and evenly spaced distance from one another in order to substantially reduce or entirely eliminate the excessive amount of hand labor involved in thinning rows of crops after germination, as is required when such crops are planted by conventional seeders. Not only would a great saving in labor cost be effected by precision planting of seeds but the amount of seed saved would also be impressive.

An additional serious drawback to seed planters in use today is the inability of the operator to be continuously apprised of whether the seeds are being planted or whether the seeds are jammed within the planter in such fashion as to prevent such being deposited in the furrow. A planter in accordance with this invention provides continuous visibility of operation of the seed selecting mechanism so that the operator is always apprised of the proper functioning of the planter.

Accordingly, it is an object of this invention to provide a seed planting machine which will deposit seeds in the ground singly and evenly spaced from one another with an unusual degree of accuracy even at high planting speeds.

Another object of this invention is to provide an improved tractor drawn seeder which will simultaneously open a furrow, drop seeds in the furrow in precisely spaced relationship and close the furrow.

Still another object of this invention is to provide an improved precision seeder of the type having a ground engaging wheel for actuating the seed selecting mechanism in timed relationship with the forward speed of the planter for accurate placement of the seed in the ground.

Another object of this invention is to provide in a seed planting machine a secondary hopper or seed box, wherein the seed selecting wheel rotates, of substantially less volume than the primary hopper containing the bulk of the seed to avoid crushing or grinding the seed.

A further object of this invention is to provide a planter having a transparent element incorporated in the seed selecting mechanism whereby operation of such mechanism may be readily observed.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Figure 1 is a side elevational view of a precision planter embodying this invention.

Figure 2 is an enlarged fragmentary, longitudinal, sectional view of the seed wheels shown in relation to the seed hopper.

Figure 3 is a cross sectional view taken on the plane 3—3 of Figure 1.

Figure 4 is a fragmentary sectional view taken on the plane 4—4 of Figure 1.

Figure 5 is a fragmentary sectional view taken on the plane 5—5 of Figure 1.

Figure 6 is a fragmentary perspective detail view showing the separator between the seed wheels.

Figure 7 is a fragmentary plan view taken between the lines 7—7 of Figure 1.

As shown on the drawings:

In Figure 1 there is illustrated an assembled precision seeder embodying this invention. Such seeder comprises essentially a frame 10, a ground engaging driving wheel 20 rotatably mounted on frame 10, a boot 25 depending from frame 10 and mounted rearwardly of wheel 20, a prepacking wheel 63 pivoted to boot 25 a seed hopper 30, a seed selecting and depositing mechanism 40, both of the latter elements being mounted on frame 10, and a furrow packing wheel 60 supporting the rear end of frame 10.

Frame 10 comprises two spaced strap members 11 having a generally horizontal central portion 17, a downwardly inclined rear portion 16 and an upwardly inclined front portion 18. At the rear end of rear portion 16, the packing wheel 60 is rotatably mounted on a shaft 12 transversely supported by the ends of strap members 11. Packing wheel 60 in addition to supporting the rear end of frame 10 gives a final packing to the earth after the furrow opened by boot 25 has been filled in by the pre-packing wheel 63 as will be later described. The forward ends of straps 11 may be pivotally connected to a tractor draw bar (not shown) or any other prime mover.

A ground engaging wheel 20, preferably rubber tired, is rotatably supported between strap members 11 of frame 10 on the upwardly sloping front portion 18. A depending bracket 19 is respectively provided on each strap 11 in opposed relationship to support axle 21 of wheel 20.

On the horizontal central portion 17 of frame 10, there is mounted the hopper 30 and seed selecting mechanism 40 which will be later described.

An inverted channel shaped base plate 22 is mounted on the forward part of the horizontal portion 17 of frame 10 and such plate is secured to the frame by a plurality of bolts 23. A rectangular aperture 59 is provided in plate 22 substantially in the center thereof. A bearing 24 is bolted to the top of base plate 22 and such bearing rotatably supports a transversely disposed shaft 26.

Shaft 26 projects outwardly beyond each side of bearing 24, one end thereof projecting beyond frame 10 while the other end of such shaft overhangs the aperture 59 of base plate 22. A sprocket 27 is secured to the end of shaft 26 projecting out of bearing 24 and beyond frame 10. A sprocket 28 is provided on the projecting end of axle 21 in alignment with sprocket 27. A chain 29 connects the sprockets 27 and 28. An idler sprocket 31 is secured to a bracket 32 which is pivotally mounted on frame 10 in such fashion that the idler sprocket 31 may be adjusted by moving bracket 32 to effect tensioning of chain 29. Thus rotary movement of ground engaging wheel 20 effects rotation of shaft 26 through the connection of chain 29 with sprockets 27 and 28.

A pair of seed wheels 33 are secured to the other end of shaft 26 in spaced relationship as shown in Figures 4 and 6 and such wheels revolve in the aperture 59 of plate 22. Each of the seed wheels 33 is provided with a saw tooth circular periphery, and a plurality of radially spaced seed pockets 34 are formed in such periphery, preferably spaced equidistantly. Each of the wheels 33, however, is so positioned on shaft 26 that pockets 34 on one wheel are angularly staggered or misaligned with respect to corresponding pockets on the adjacent wheel in order to provide a greater planting rate in relation to the speed of the wheels as will be later described. The staggering of pockets on each wheel should be such that the pockets 34 on one wheel will be spaced equidistantly between the pockets on the other wheel. It should be mentioned here that seed pockets 34 can be of any suitable shape and formed about the periphery of the seed wheels 33 in any desired manner. In the preferred embodiment of this invention, however, a plurality of ratchet-like teeth 35 are provided about the periphery of each seed wheel 33, each having a substantially radial face 36, and in the radial face 36 of each tooth 35, there is provided a substantially semi-spherical seed receiving pocket 34. The axis of such pocket is substantially perpendicular to the radial face 36 and the size of pocket 34 is such as to accommodate only a single seed or pellet.

A primary hopper 30 comprising a sheet metal box provided with a sloped bottom 37 is vertically supported on frame 10 by a vertically disposed bracket 38 secured to frame 10 by a bolt 39. The forward face of hopper 30 is secured to a box-like seed discharge spout 41 bolted or otherwise secured to base plate 22. A pair of bolts 42 secure hopper 30 to spout 41 and a supporting angle 43 is provided underneath hopper 30, such angle being secured to spout 41 by a bolt 44. A forwardly facing aperture 45 is provided near the bottom of hopper 30 which communicates with spout 41 to permit seed contained in hopper 30 to flow into box-like secondary hopper 41. A gate 46 is provided for controlling the flow of seed into secondary hopper or box 41, such gate comprising a thin sheet of metal slotted to receive a wing nut and bolt 47 to cooperate with such slot and the side of the primary hopper 30 to secure gate 46 at any desired vertical position of adjustment.

The box 41 is slotted to permit entry of seed wheels 33 to the interior of such box. A spacer 48 substantially vertically disposed is integrally formed with the base portion of box member 41 and such spacer is disposed between the two wheels 33 to effectively prevent any seed from falling in between such wheels. The slots in the forward end of box 41 to admit wheels 33 are arcuately formed as shown at 49 to conform to the radius of wheels 33 which prevents seed from falling out of the bottom of box 41, inasmuch as wheel 33 is in substantially intimate contact with the arcuate cut 49.

A boot 25 surrounds a depending tubular boot support 50. Boot 25 is of well-known construction and is utilized for opening a furrow for the reception of seed deposited by the seeder. Tubular support 50 fits within the aperture or slot 59 provided in the base plate 22 and is so positioned that the forward edge of wheels 33 is substantially aligned with the axis of tubular support 50. A depending lip 61 provided at the forward edge of slot 59 permits the boot support 50 to be secured thereto by a bolt 61a for mounting in the position shown in Figure 1. A plurality of transversely disposed teeth 51 are provided on the front face of tubular support 50 which are readily engageable by corresponding teeth provided on boot 25 whereby boot 25 may be secured by a single bolt and nut 52 in any desired vertical position of adjustment within the limits provided. A seed receiving and conveying tube 53 is secured within tubular support 50 for the reception of seeds from seed wheels 33 as will be later described.

A cover 54 is shaped to surround the exposed portion of wheels 33 between seed box 41 and base plate 22. Cover 54 is preferably made of transparent plastic material. Such cover surrounds the top of seed wheels 33 and extends radially inwardly from the periphery thereof a substantial distance as best shown at Figure 4. The top of cover 54 is curved downwardly between the wheels 33 to form a substantially U-shaped re-entrant portion, as shown in Figure 4. Such cover fits snugly against the periphery of each wheel 33 and likewise against the top surface of bottom plate 22 and against the top of a suitable cover 41a provided on top of seed box 41. One end of a helical spring 55 is hooked within a hole provided in an L-shaped bracket 56 welded to base plate 22 and such spring fits within the U shape 57 defined by the dip of cover 54 between wheels 33. The other end of such spring extends rearwardly to where it is hooked on to a ring 58 on the upper forward edge of seed box 41. An integral lug 62 is provided on cover 54 which is engageable by link 58. Thus when spring 55 is secured in place on top of cover 54, such cover is yieldingly secured in position adjacent the rotary wheels 33 to retain seeds contained in each pocket 34.

The type of pre-packing wheel, indicated by numeral 63, and the mounting therefore preferably used with the seeder of this invention, is shown immediately in back of seed boot 25 in Figure 1. Packing wheel 63 is rotatably supported in a frame 64 formed of strap material and bent into an elongated U-shape. A transverse pin 65 is welded to the forwardly disposed face of boot 25 in such fashion that a portion of such pin projects somewhat beyond the respective sides of the boot. Each free end of frame 64 is suitably apertured for mounting on the respective ends of pin 65, thereby pivotally securing such frame to boot 25. Wheel 63 is rotatably mounted in frame 64 by a transverse pin 66, and such wheel is maintained in spaced relationship with respect to the inner faces of frame 64 by a washer 67 provided on opposite sides of wheel 63.

The pivotal mounting of frame 64 to boot 25 allows wheel 63 to move in a vertical path thereby insuring that such wheel will follow the ground contour to positively and uniformly cover and pack the seed planted.

In operation, the hopper 30 is first filled with seed to be planted and the seed preferably is of the pelletized type which provides a substantially uniform size and can be more readily and accurately handled by the seeder. Gate 46 is opened at the start of the planting operation and the pelletized seed drops into seed box 41. Forward motion of the tractor effects rotation of wheel 20 thereby causing chain 29 to rotate sprocket 27, sprocket 28 being the driving sprocket. Boot 25 opens a furrow in the usual manner as the seeder moves forwardly. Sprocket 27 is secured to shaft 26 and rotates seed wheels 33 through seed box 41 and hence through the seed accumulated in such box. An individual seed will be collected in each pocket 34 passing through seed box 41. As seed wheels 33 rotate in a clockwise direction, as shown in Figure 1, each pocket 34 transports a seed from the seed box 41 in an arcuate path underneath cover 54 until each seed receiving pocket 34 approaches the horizontal axis of seed wheel 33, whereupon the combination of gravity and centrifugal forces cause the seed pellet contained in such pocket to drop downwardly through the seed receiving and conveying tube 53 into the furrow opened by boot 25. Pre-packing wheel 63 closes the furrow opened by boot 25 and packs the soil relatively lightly over the seed. As the seeder proceeds along, the packing wheel 60 supporting the rear end of frame 10 firmly packs the soil above the seed.

The spacing of the seeds deposited in the furrow is, of course, a function of the rate of rotation of seed wheel 33 and the angular spacnig of seed pockets 34. By providing a plurality of seed wheels 33, a closer spacing can be conveniently had. Of course, it will be appreciated that in addition to providing a greater or lesser number of seed pockets, and properly staggering the seed pockets of each seed wheel, the speed of rotation of such wheels as well as the ground speed of the planter itself must be taken into account. However, by proper selection of these various variables, it will be appreciated that almost any desired combination of seed spacing and planting speed can be attained.

From the foregoing description it will be appreciated that there is here provided a planter of simple and sturdy construction which will positively and uniformly deposit seed into the furrow in evenly spaced relationship. The seeder wheels will positively select but one seed for one seed pocket, thereby insuring such uniformity of planting as to substantially eliminate the necessity of subsequent plant thinning.

Further, the fact that the seed wheels pass only through the relatively small quantity of seeds contained in seed box 41 greatly reduces the agitating effects on the main body of seeds contained in hopper 30 and thus minimizes damage to the seeds.

The cover surrounding the exposed portion of the seed wheels positively insures the retention of seeds in the seed pockets until the proper time of discharge of such seeds from the pockets. The cover being transparent and readily visible from above the planter permits the seed selection operation to be viewed at any time, thus enabling the operator to observe whether the seeds are being regularly deposited without the necessity of stopping for such observation. In the event of a jam, the cover is readily detachable thereby enabling the operator to quickly correct the difficulty.

It will also be appreciated that by proper selection of the number of seed selection wheels, the quantity of seed planted can be increased or decreased as desired and by varying the spacing or staggering of the seed pockets between the respective wheels, the spacing of the planted seeds can be readily changed. By changing the sizes of the various sprockets and by varying the linear speed of the seeder itself, further variations in the planting of the seed may be introduced. It is further pointed out that a plurality of the seeders herein described can be readily attached to the draw bar of the tractor whereby several rows of seeds may be planted simultaneously.

It will be further appreciated that since the seed wheel does not revolve within a large container full of seeds, there is little, if any, damage to the seed which insures better seed germination. As there is practically no seed damage from this source, there is as a consequence no dust or broken seed particles to interfere with the operation of the planter.

It will, of course, be understood that various details of construction may be varied through a wide range without departing from the principles of this invention and it is, therefore, not the purpose to limit the patent granted hereon otherwise than necessitated by the scope of the appended claim.

I claim:

In a seed selecting device having a seed hopper and a pair of axially adjacent seed selecting wheels coaxially rotatably mounted so that a portion of their peripheries pass through said hopper, said wheels having a plurality of seed receiving pockets formed in their peripheries; the improvements comprising an arcuate transparent cover formed to surround a portion of the path of rotation of the peripheries of both seed wheels, said cover having a re-entrant portion projecting radially inwardly between said seed wheels, means for pivotally supporting one end of said cover, and a helical spring disposed in said re-entrant portion and arranged to secure said cover in fixed relation relative to the rotary path of the peripheries of said wheels.

HERMAN WECHSLER.

References Cited in the file of this patent

UNITED STATES PATENTS

| Number | Name | Date |
|---|---|---|
| 90,200 | Shepherd | May 18, 1869 |
| 117,835 | Vaniz | Aug. 8, 1871 |
| 129,943 | Gessner | July 30, 1872 |

(Other references on following page)

| Number | Name | Date |
|---|---|---|
| 204,941 | Barlow | June 18, 1878 |
| 404,853 | Mast | June 11, 1889 |
| 434,749 | Anderson | Aug. 19, 1890 |
| 583,605 | Saviers | June 1, 1897 |
| 603,213 | Stewart | Apr. 26, 1898 |
| 607,502 | Caldwell | July 19, 1898 |
| 899,557 | Patric | Sept. 29, 1908 |
| 988,539 | Balint | Apr. 4, 1911 |
| 1,161,369 | Ayers | Nov. 23, 1915 |
| 1,260,808 | Reed | Mar. 26, 1918 |
| 1,279,804 | Welcker | Sept. 24, 1918 |
| 1,474,599 | Martin | Nov. 20, 1923 |
| 1,879,055 | Boykin | Sept. 27, 1932 |
| 2,174,120 | Cobbley et al. | Sept. 26, 1939 |
| 2,195,703 | Lynch | Apr. 2, 1940 |
| 2,440,846 | Cannon | May 4, 1948 |
| 2,475,381 | Erickson | July 5, 1949 |
| 2,496,885 | Milton | Feb. 7, 1950 |
| 2,562,070 | Strong | July 24, 1951 |

FOREIGN PATENTS

| Number | Country | Date |
|---|---|---|
| 718,448 | France | Nov. 4, 1931 |